(12) United States Patent
Yu

(10) Patent No.: US 7,188,987 B2
(45) Date of Patent: Mar. 13, 2007

(54) DISPLAY MODULE

(75) Inventor: Chuan-Pei Yu, I-Lan Hsien (TW)

(73) Assignee: Jemitek Electronics Corp., Taipei (TW)

( * ) Notice: Subject to any disclaimer, the term of this patent is extended or adjusted under 35 U.S.C. 154(b) by 64 days.

(21) Appl. No.: 10/906,868

(22) Filed: Mar. 10, 2005

(65) Prior Publication Data

US 2006/0044831 A1    Mar. 2, 2006

(30) Foreign Application Priority Data

Aug. 27, 2004   (TW) .............................. 93125969 A

(51) Int. Cl.
*F21V 7/04* (2006.01)
(52) U.S. Cl. ...................... 362/608; 362/235; 362/511; 362/610; 362/612; 362/613; 362/615; 362/617; 362/620

(58) Field of Classification Search ................ 362/231, 362/235, 615, 617, 620, 511, 608, 610, 612, 362/613
See application file for complete search history.

(56) References Cited

U.S. PATENT DOCUMENTS 6,540,377 B1 *  4/2003  Ota et al. .................... 362/231
6,608,332 B2 *  8/2003  Shimizu et al. ............... 257/98

* cited by examiner

*Primary Examiner*—Stephen F Husar
*Assistant Examiner*—Meghan K. Dunwiddie
(74) *Attorney, Agent, or Firm*—Winston Hsu

(57) ABSTRACT

A backlight module has a light guide plate having a transparent plate and a light-mixing structure. The light-mixing structure contains a light-convergence body and a light-dispersing body connected with each other to form an hourglass-shaped structure. With the light-mixing structure, the light guide plate can mix light beams of different colors to produce white light beams.

35 Claims, 8 Drawing Sheets

DISPLAY MODULE

BACKGROUND OF INVENTION

1. Field of the Invention

The present invention is related to a backlight module, and more particularly, to a backlight module able to provide a liquid crystal display with a light source generator having a high color rendering property.

2. Description of the Prior Art

Backlight modules are one of the major component devices of liquid crystal display (LCD) products, and have been widely applied to digital cameras, mobile phones, personal digital assistants (PDAs), computer monitors, and flat TVs at present. Generally, a backlight module, being mostly installed in the backside of a display panel, includes a light source generator, a light guide plate, and several sorts of light diffusion elements. The light guide plate is one of the light diffusion elements used for diffusing light generated from the light source generator to the display panel for providing homogeneous brightness to the display panel.

Generally, backlight modules may roughly be divided into two categories: direct-underlying backlight modules and edge-lit backlight modules. The design of direct-underlying backlight module is to place the light source generator in the backside of the display panel. Since the holding space is larger, plenty of lamp tubes can be used to enhance the light intensity so that it is widely applied to a display panel requiring higher brightness and larger size. An LCD monitor with a high-brightness requirement or designed for use outdoors, or an LCD TV is suitable for applying the direct-underlying backlight module thereto. Furthermore, the direct-underlying backlight module often adopts a plurality of lamp tubes, such as cold cathode fluorescent lamps (CCFLs) or external electrode fluorescent lamps (EEFLs) as a light source generator. On the other hand, the light source generator of an edge-lit backlight module is placed to the edge of the backlight module to reduce the thickness. This kind of design can fit consumer demand of light, thin, and low-power devices and is mainly applied to portable information products. Taking mobile phone as an example, most LCD modules used are edge-lit backlight modules, and the light source generator is a group of light emitting diodes (LEDs), which have advantages of small size and low power consumption.

Generally, an LCD module requires white light from its light source generator. However, the technique of developing white light LEDs is not mature, so that a conventional LED light source generator uses fluorescent powders with a monochromatic LED (such as a blue LED) to obtain white light. The principle is that the fluorescent powders absorb a part of the blue light produced by the LED chip to emit yellowish-green light, and the remaining blue light is mixed with the yellowish-green light to form white light. Applying the white light produced by the monochromatic LED chip together with the fluorescent powder as the light source generator of the LCD module is well-known. However, a drawback of this method is insufficient color saturation of the LCD module due to a smaller distribution of the color range so that the performance of a small LCD module using an LED as its light source generator is inferior to that of the large LCD monitor having conventional fluorescent lamps. This needs to be improved.

SUMMARY OF INVENTION

It is therefore a primary objective of the present invention to provide a light guide plate and a backlight module for solving the aforementioned problems.

According to the claimed invention, a light guide plate including a transparent plate and a light-mixing structure is provided. The light-mixing structure, connected to the transparent plate, includes a first triangular plate and a second triangular plate. The first triangular plate has a light-exit plane connected to at least a side of the transparent plate, and the first triangular plate further includes a first vertex angle, which is an opposite vertex angle of the light-exit plane. The second triangular plate has a second vertex angle which is connected to the first vertex angle and allows the first and second triangular plate to form as hourglass-shaped structure. In addition, the second triangular plate further includes a light-incidence plane.

Since the light guide plate of the present invention has a unique light-mixing structure, the backlight module need only utilize conventional multicolor LEDs such as red, blue, and green ones as the light source generator. This allows the light guide plate to produce white light via the light-mixing structure to meet the demand of the light source generator required by the LCD panel for providing better color saturation.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
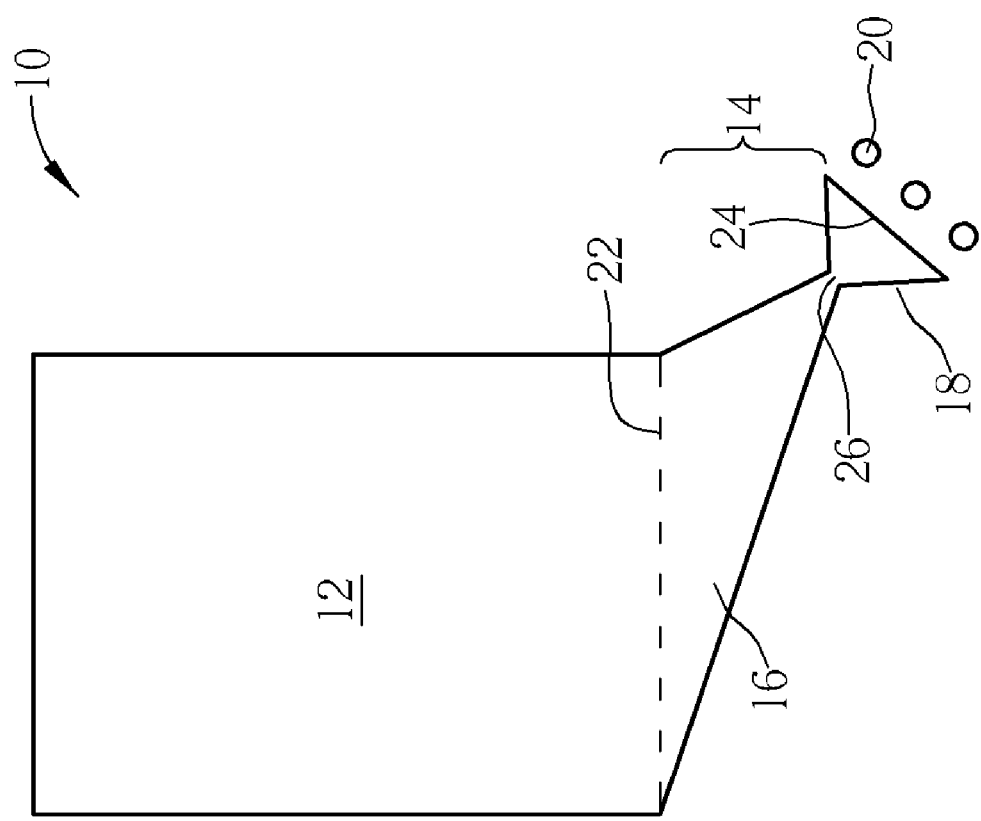
FIG. 1 is a top view of a light guide plate of the present invention.
Figure 2:
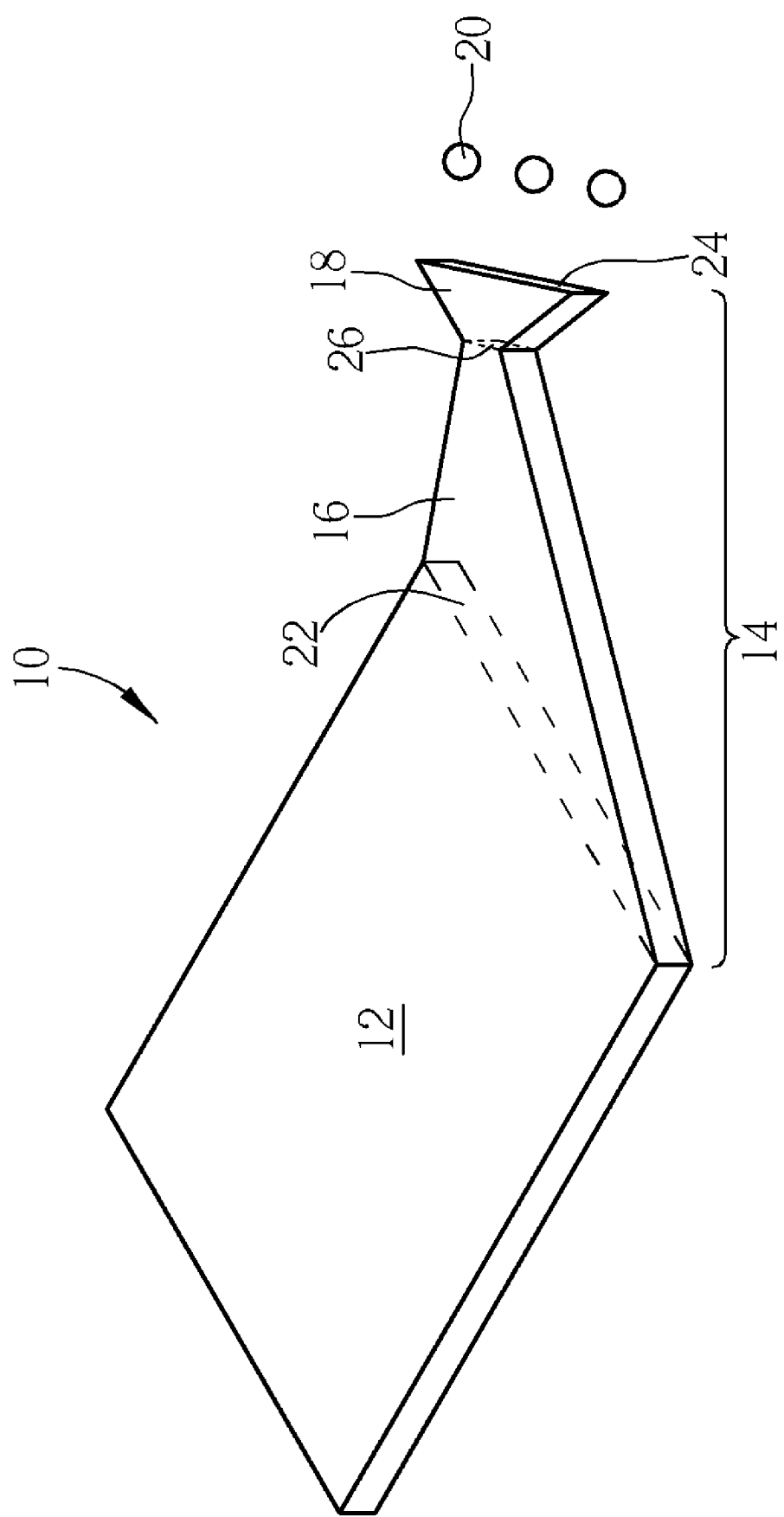
FIG. 2 is a perspective diagram of a light guide plate shown in FIG. 1.

Please refer to FIG. 1 and FIG. 2. FIG. 1 is a top view of a light guide plate 10 of the present invention. FIG. 2 is a perspective diagram of the light guide plate 10 shown in FIG. 1. The light guide plate 10 includes a transparent plate 12 and a light-mixing structure 14. The transparent plate 12 is used to homogeneously conduct the light produced from the light source generator 20 to a LCD display panel positioned on the light guide plate 10. The light-mixing structure 14 includes a first triangular plate 16 and a second triangular plate 18. The first triangular plate 16 and the second triangular plate 18 are a light-dispersing body and a light-convergence body respectively, and both of them have a vertex angle 26 in common and are connected with each other to form an hourglass-shaped structure, wherein the first triangular plate 16 is larger than the second triangular plate 18. The first triangular plate 16 further has a light-exit plane 22 connected to a side of the transparent plate 12, and the area of the light-exit plane 22 is equal to that of the side of the transparent plate 12 connected thereto. In addition, the vertex angle 26 is the opposite vertex angle of the light-exit plane 22 of the first triangular plate 16. The second triangular plate 18 includes a light-incidence plane 24 for receiving light from the light source generator 20. The design of the second triangular plate 18 is to make the light from the light-incidence plane 24 scatter homogeneously therein, and be mixed and converged to the vertex angle 26. Passing through the first triangular plate 16, the light proceeds to disperse into the transparent plate 12.

Figure 3:
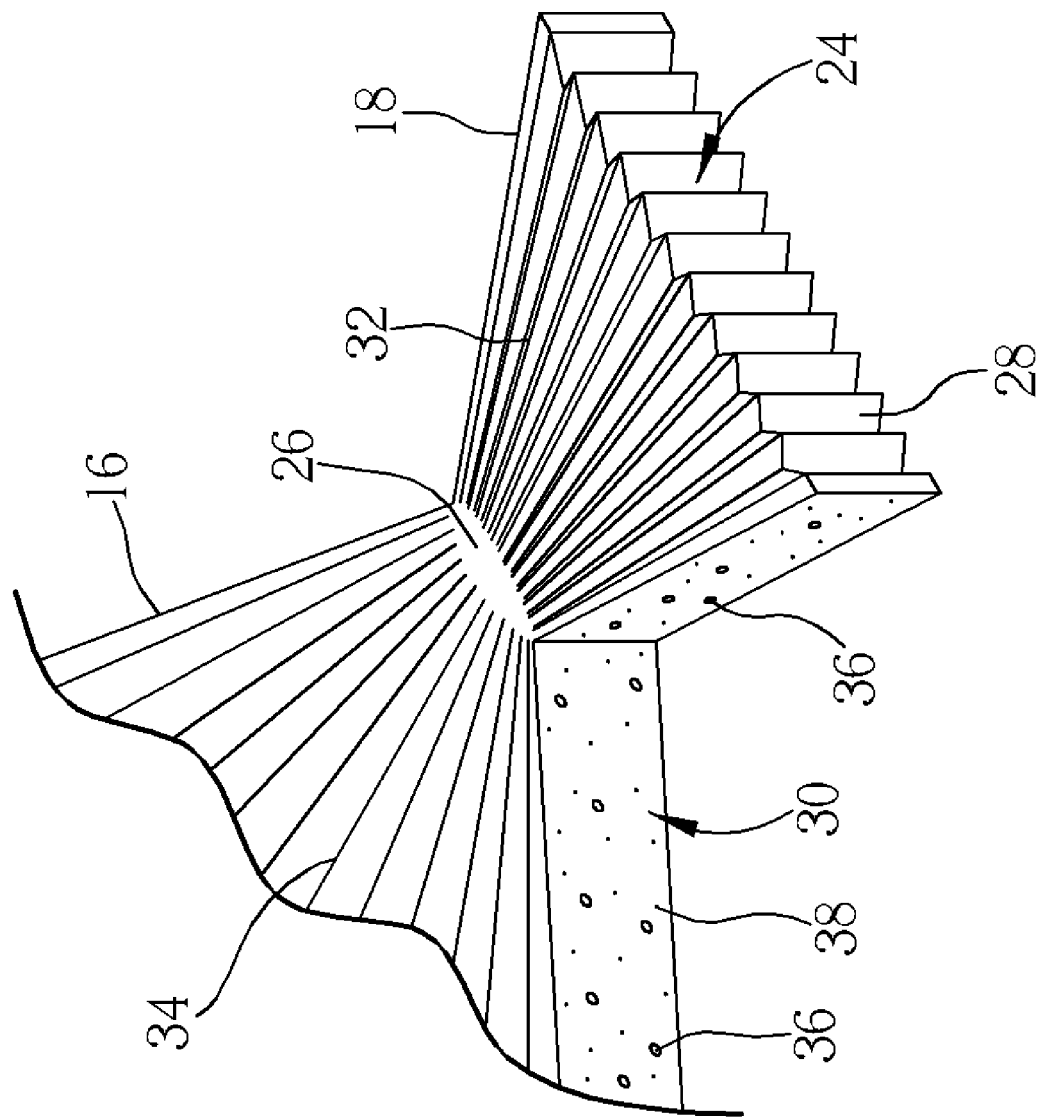
FIG. 3 is an enlarged schematic view of the second triangular plate and a part of the first triangular plate shown in FIG. 1.

Please refer to FIG. 3. FIG. 3 is an enlarged schematic view of the second triangular plate 18 and a part of the first triangular plate 16 shown in FIG. 1. As shown in FIG. 3, the surface of the light-incidence plane 24 of the second triangular plate 18 has a plurality of notches 28. In the present embodiment, the notches 28 are V-shaped notches so that a zigzag structure is formed on the surface of the light-incidence plane 24. Similarly, there are pluralities of V-shaped notches 32, 34 disposed to the top and bottom surfaces of both the second triangular plate 18 and the first triangular plate 16 for providing the light beams entering the light-mixing structure 14 with a dispersing path to enhance the performance of light mixing. In addition, a plurality of V-shaped notches or cavities 36 can be selectively disposed to the surfaces of the side 30 of both the second triangular plate 18 and the first triangular plate 16 so as to enhance the light dispersing effect.

On the other hand, a plurality of light-scattering particles 38 in white or having various reflective indices can be optionally disposed in the transparent plate 12 and the light-mixing structure 14, where the light-scattering particles 38 can be dispersed in the transparent plate 12, the second triangular plate 18 and the first triangular plate 16 for use in enhancing the effect of light scattering within the light guide plate 10, and further enhancing the brilliance. Furthermore, except for the light-incidence plane 24 and the light-exit plane 22, a reflection layer (not shown) is further disposed to the top, bottom, and side surfaces of the light-mixing structure 14 to fully cover the light-mixing structure 14 to enhance the light utilization rate.

In the present embodiment, the transparent plate 12 and the light-mixing structure 14 are made of the same material so that the light guide plate 10 of the present invention can be monolithically formed by means of an injection molding process. In addition, a flat plate of the guide light plate 10 can first be fabricated and subsequently be processed by means of machining, for example. The light-incidence plane 24 can be etched to form the notches 28, and a plurality of cavities 36 at the side 30 can be perforated.

Figure 4:
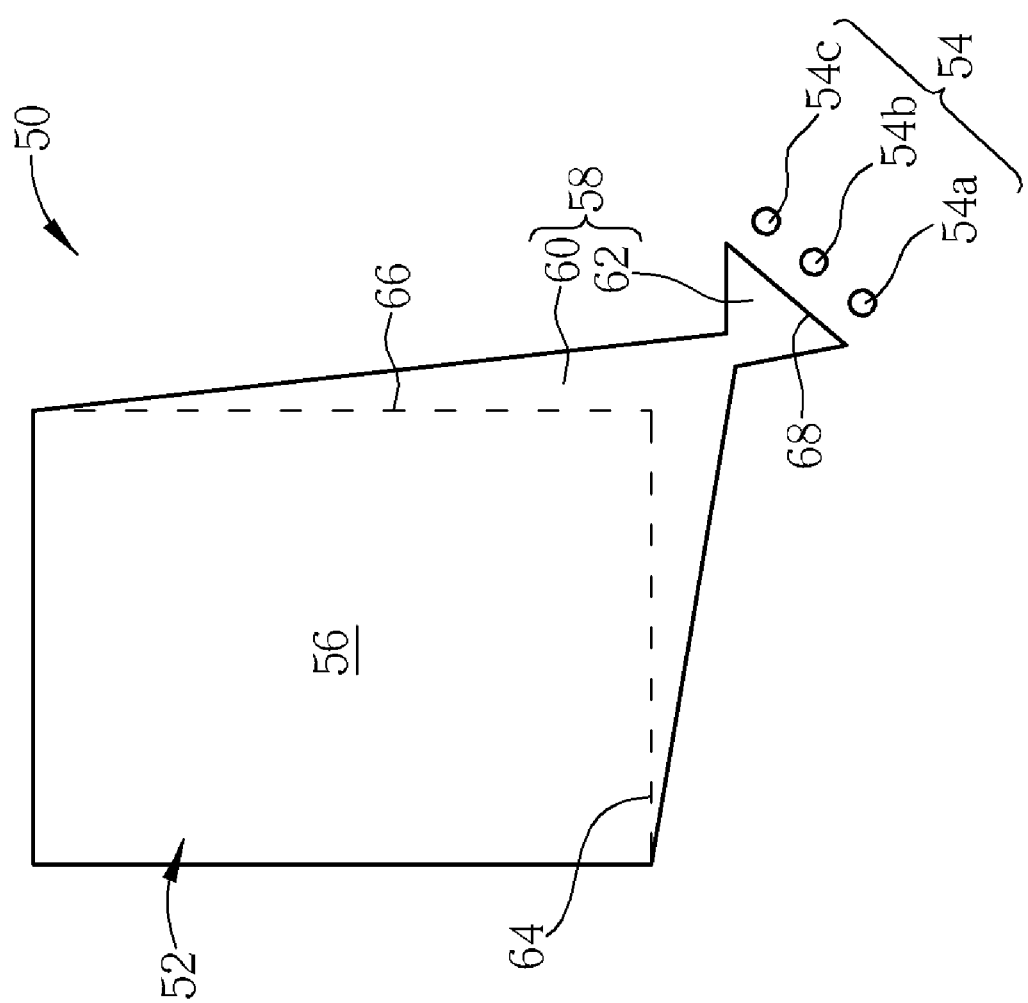
FIG. 4 is a top view of a backlight module according to a second embodiment of the present invention.

Please refer to FIG. 4. FIG. 4 is a top view of a backlight module 50 according to a second embodiment of the present invention. The backlight module 50 includes a light guide plate 52 and a multicolor light source generator 54. The multicolor light source generator 54 includes a plurality of LEDs of different colors. The multicolor light source generator 54 shown in FIG. 4 has a blue LED 54a, a green LED 54b, and a red LED 54c.

The light guide plate 52 includes a transparent plate 56 and a light-mixing structure 58. The light-mixing structure 58 includes a light-dispersing body 60 and a light-convergence body 62, wherein the light-dispersing body 60 is connected to two sides of the transparent plate 56, and the contact planes are the light-exit plane of the light-dispersing body 60 and the light incident plane of the transparent plate 56 as well. In order to provide a better path for conducting light into the transparent plate 56, the area of the light-exit plane of the light-dispersing body 60 can be designed to meet the requirement of the LCD module. In the present embodiment, the area of the light-exit plane of the light-dispersing body 60 is equal to that of the side of the transparent plate 56 connected thereto, as the planes 64, 66 show in FIG. 4.

Figure 5:
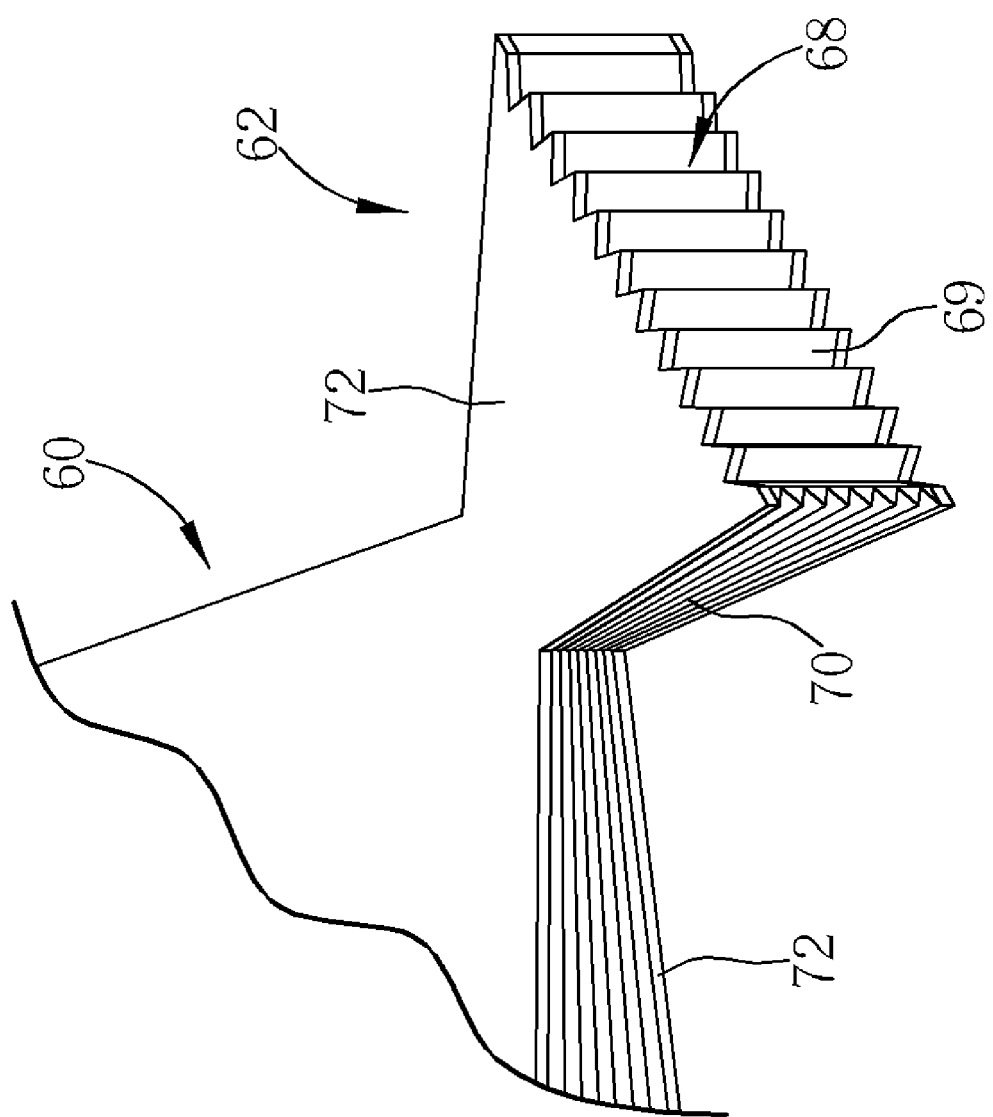
FIG. 5 is an enlarged schematic view of a light-convergence body shown in FIG. 4.

Please refer to FIG. 5, which is a enlarged schematic view of the light-convergence body 62 shown in FIG. 4. The light-convergence body 62, connected to the light-dispersing body 60, has a light-incidence plane 68 for use in receiving light from the multicolor light source generator 54, and the shape of the light-convergence body 62 converges from the light-incidence plane 68 to the joint of the light-dispersing body 60. In addition, the surface of the light-incidence plane 68 has a plurality of notches 69 for enhancing the dispersion of the light. Furthermore, a plurality of notches 70 are disposed to the side surfaces of the light-convergence body 62 or the surfaces of the light-dispersing body 60 to provide better light-mixing performance within the light-convergence body 62. On the other hand, to enhance the light utilization rate, a reflection layer is disposed respectively to a part of the surface of both the light-dispersing body 60 and the light-convergence body 62 (only the reflection layers 72 disposed to the top and bottom surfaces of both the light-dispersing body 60 and the light-convergence body 62 are shown in FIG. 5), for reflecting light back into the light-dispersing body 60 and the light-convergence body 62 to ensure that light leaves the light-mixing structure 58 only from the planes 64 and 66 and enters the transparent plate 56.

In the present embodiment, a plurality of light-scattering particles (not shown) can be positioned into the light-mixing structure 58. For example, a plurality of scattering particles of white color or possessing various reflective indices can be disposed into the light-convergence body 62 for enhancing the effect of light-mixing.

When applying the backlight module 50 as the backlight source of an LCD module, light coming from the blue LED 54a, the green LED 54b, and the red LED 54c may enter the light-mixing structure 58 through the light-incidence plane 68, and mix well within the light-mixing structure 58 via scattering pathways provided by the notches 69 and 70 on the light-mixing structure 58 and the light-scattering particles. This forms white light which enters the transparent plate 56 through the planes 64 and 66 for providing the LCD module with a white light source.

Figure 6:
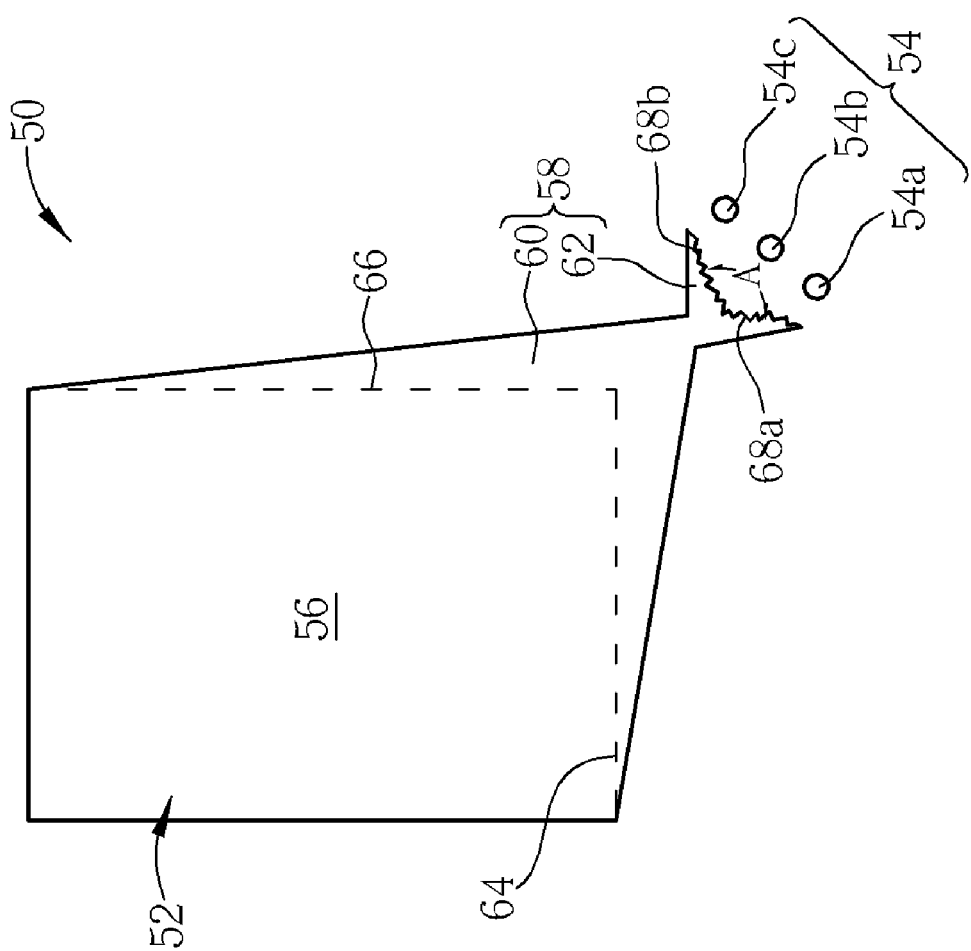
FIG. 6 is a top view of a backlight module according to a third embodiment of the present invention.

Please refer to FIG. 6. FIG. 6 is a top view of a backlight module according to a third embodiment of the present invention. For convenience, each element shown in FIG. 6 adopts the reference numerals of FIG. 4. As shown in FIG. 6, the light-convergence body 62 includes two light-incidence planes 68a and 68b, intersecting to form an obtuse angle A where the multicolor light source generator 54 is positioned nearby. In addition, the surface of the light-incidence planes 68a and 68b includes V-shaped notches.

Figure 7:
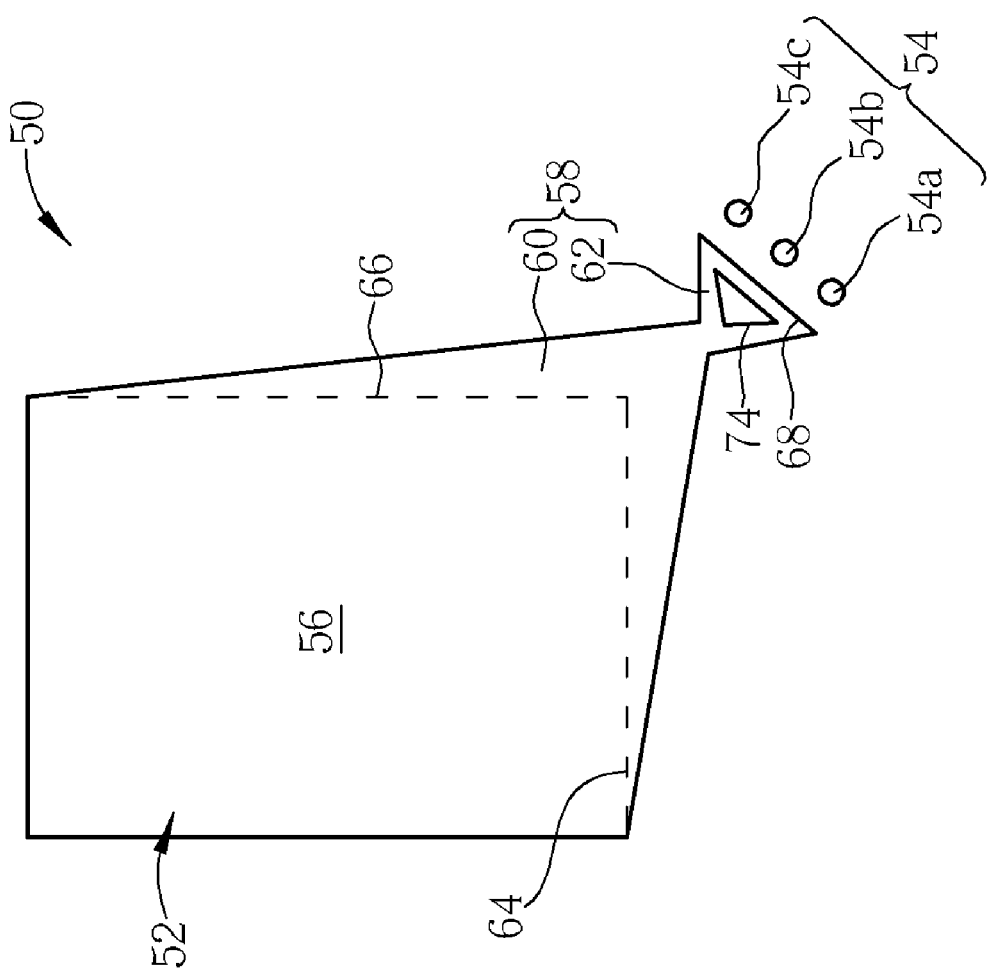
FIG. 7 is a top view of a backlight module according to a fourth embodiment of the present invention.

Please refer to FIG. 7, which is a top view of a backlight module according to a fourth embodiment of the present invention. In the present embodiment, the light-convergence body 62 further includes a light-dispersing mechanism 74, positioned in the light-convergence body 62 and which is in the shape of a triangular plate. The light-dispersing mechanism 74 is a hollow triangular plate, that is, a hollow triangular plate is situated inside the light-convergence body 62, wherein a side of the hollow triangular plate is approximately parallel to the light-incidence plane 68 to allow blue, green, and red light produced by the blue LED 54a, the green LED 54b, and the red LED 54c respectively to enter the light-incidence plane 68 and then mix well via the light-dispersing mechanism 74.

Figure 8:
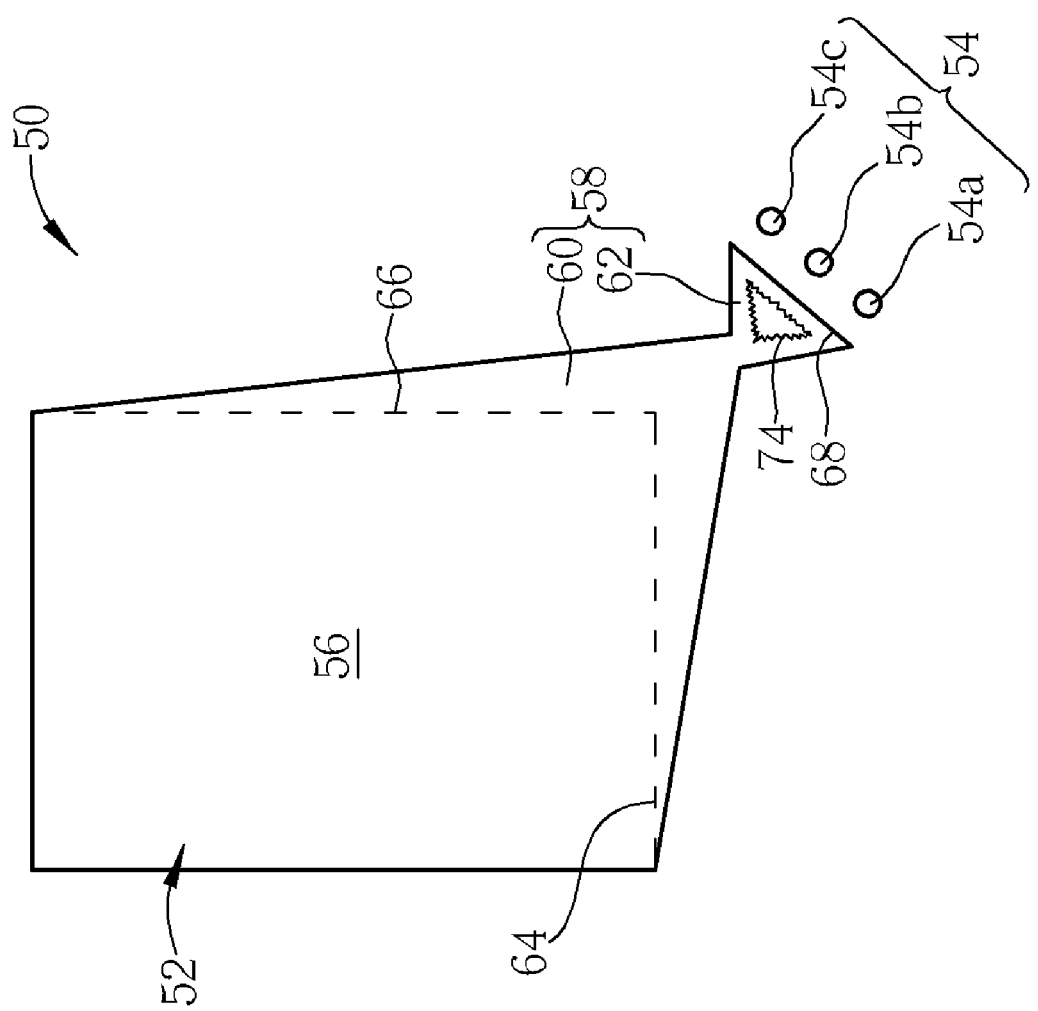
FIG. 8 is a top view of a backlight module according to a fifth embodiment of the present invention.

To enhance the light-mixing performance of the light-dispersing mechanism 74, please refer to a top view of a backlight module according to a fifth embodiment of the present invention, as shown in FIG. 8. In the present embodiment, the light-mixing structure 58 includes a light-dispersing mechanism 74 positioned inside the light-convergence body 62, wherein the light-dispersing mechanism 74 is a hollow triangular plate positioned inside the light-convergence body 62. It is noted that, the surface of the hollow triangular plate has a plurality of notches, for example, a V-shaped notch, so as to enhance the light-mixing performance inside the light-convergence body 62.

In comparison with the prior art, the light guide plate according to the present invention has a light-mixing structure so that the light source generator of the backlight module can be LEDs of different colors. The light can be mixed via the light-mixing structure to produce white light with better color range, and then collocates with color filters of the LCD panel to improve the color saturation. The intensity of the LEDs can also be controlled by modifying the light-mixing structure. Furthermore, since the present invention light guide plate including a light-mixing structure can be monolithically formed, it has an advantage that the fabrication process is simple so that it is suitable for mass production. As a result, the present invention backlight module can replace the white light source produced by blue LED and fluorescent powders in the prior art to improve the color saturation and image property.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A light guide plate comprising:
a transparent plate; and
a light-mixing structure connected to the transparent plate, the light-mixing structure comprising:
a first triangular plate having a light-exit plane connected to at least a side of the transparent plate, and the first triangular plate having a first vertex angle being an opposite vertex angle of the light-exit plane; and
a second triangular plate having a second vertex angle connected to the first vertex angle allowing the first triangular plate and the second triangular plate to form an hourglass-shaped structure, the second triangular plate further having a light-incidence plane.

2. The light guide plate of claim 1, wherein the area of the light-exit plane is equal to that of the side of the transparent plate connected thereto.

3. The light guide plate of claim 1, wherein at least a surface of the second triangular plate comprises a plurality of notches.

4. The light guide plate of claim 3, wherein the notches are a plurality of V-shaped notches.

5. The light guide plate of claim 1, wherein at least a surface of the light-mixing structure comprises a plurality of cavities.

6. The light guide plate of claim 1, wherein at least a surface of the first triangular plate comprises a plurality of notches.

7. The light guide plate of claim 6, wherein the notches are a plurality of V-shaped notches.

8. The light guide plate of claim 1, wherein the volume of the second triangular plate is smaller than that of the first triangular plate.

9. The light guide plate of claim 1, wherein the light-mixing structure further comprises at least a reflection layer positioned to at least a surface of either the first triangular plate or the second triangular plate.

10. The light guide plate of claim 1, wherein the light-mixing structure further comprises a plurality of light-scattering particles spread inside the first and the second triangular plate.

11. The light guide plate of claim 1, wherein the light-mixing structure and the transparent plate are a monolithically formed structure.

12. The light guide plate of claim 1, wherein the second triangular plate further comprises a light-dispersing mechanism.

13. The light guide plate of claim 12, wherein the light-dispersing mechanism is a hollow triangular plate.

14. The light guide plate of claim 13, wherein a side of the hollow triangular plate is approximately parallel to the light-incidence plane.

15. The light guide plate of claim 13, wherein at least a surface of the hollow triangular plate has a plurality of notches.

16. The light guide plate of claim 1, wherein the light guide plate is used in a backlight module, the backlight module further comprising a plurality of LEDs of different colors positioned near the light-incidence plane of the second triangular plate.

17. A backlight module comprising:
a light guide plate, the light guide plate comprising:
a transparent plate; and
a light-mixing structure, the light-mixing structure comprising:
a light-dispersing body, having at least a light-exit plane, connected to at least a side of the transparent plate;
a light-convergence body, connected to the light-dispersing body, the light-convergence body having at least a light-incidence plane; and
a plurality of light-scattering particles dispread in the light dispersing body or the light-convergence body; and
a multicolor light source generator disposed near the light-incidence plane.

18. The backlight module of claim 17, wherein the multicolor light source generator comprises a plurality of LEDs of different colors.

19. The backlight module of claim 17, wherein the LEDs of different colors comprises at least a red LED, at least a blue LED, and at least a green LED.

20. The backlight module of claim 17, wherein the light-dispersing body is a first triangular plate having a first vertex angle being an opposite vertex angle of the light-exit plane, and the light-convergence body is a second triangular plate having a second vertex angle connected to the first vertex angle for allowing the first triangular plate and the second triangular plate to form an hourglass-shaped structure.

21. The backlight module of claim 20, wherein the volume of the second triangular plate is smaller than that of the first triangular plate.

22. The backlight module of claim 17, wherein the area of the light-exit plane is equal to that of the side of the transparent plate connected thereto.

23. The backlight module of claim 17, wherein a part of the surface of the light-mixing structure comprises a plurality of notches.

24. The backlight module of claim 23, wherein the notches are a plurality of V-shaped notches.

25. The backlight module of claim 17, wherein a part of the surface of the light-mixing structure comprises a plurality of cavities.

26. The backlight module of claim 17, wherein the light-mixing structure further comprises at least a reflection layer positioned on a part of the surface of the light-mixing structure.

27. The light guide plate of claim 17, wherein the light-convergence body further comprises a light-dispersing mechanism.

28. The light guide plate of claim 27, wherein the light-dispersing mechanism is a hollow triangular plate.

29. The light guide plate of claim 28, wherein a side of the hollow triangular plate is approximately parallel to the light-incidence plane.

30. The light guide plate of claim 28, wherein at least a surface of the hollow triangular plate has a plurality of notches.

31. The light guide plate of claim 17, wherein the light-convergence body comprises two said light-incidence planes.

32. The light guide plate of claim 31, wherein the two light-incidence planes intersect to form an obtuse angle, the multicolor light source generator being positioned in the proximity of the obtuse angle.

33. The light guide plate of claim 17, wherein light-dispersing body has two light-exit planes connected to the two sides of the transparent plate.

34. The backlight module of claim 17, wherein the light-mixing structure and the transparent plate are a monolithically formed structure.

35. A backlight module comprising:
a light guide plate, the light guide plate comprising:
a transparent plate; and
a light-mixing structure, the light-mixing structure comprising:
a light-dispersing body, having two light-exit planes connected to two sides of the transparent plate; and
a light-convergence body, connected to the light-dispersing body, the light-convergence body having at least a light-incidence plane; and
a multicolor light source generator disposed near the light-incidence plane.

* * * * *